United States Patent
Lee et al.

(10) Patent No.: US 9,908,420 B2
(45) Date of Patent: Mar. 6, 2018

(54) CHARGING CONTROL METHOD AND SYSTEM FOR ELECTRIC VEHICLE

(71) Applicants: Hyundai Motor Company, Seoul (KR); Kia Motors Corporation, Seoul (KR)

(72) Inventors: Jang Hyo Lee, Gyeonggi-do (KR); Yong Kak Choi, Seoul (KR); Chun Hyuk Lee, Gyeonggi-do (KR); Sang Hoon Yoo, Incheon (KR); Jun Yeon Park, Gyeonggi-do (KR); Ho Joong Lee, Gyeonggi-do (KR); Chang Ryeol Yoo, Incheon (KR); Dong Jun Shin, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/935,382

(22) Filed: Nov. 7, 2015

(65) Prior Publication Data
US 2017/0080809 A1 Mar. 23, 2017

(30) Foreign Application Priority Data
Sep. 17, 2015 (KR) .................. 10-2015-0131513

(51) Int. Cl.
| | | |
|---|---|---|
| *B60L 9/00* | (2006.01) | |
| *B60L 11/00* | (2006.01) | |
| *G05D 1/00* | (2006.01) | |
| *G05D 3/00* | (2006.01) | |
| *G06F 7/00* | (2006.01) | |
| *G06F 17/00* | (2006.01) | |
| *B60L 11/18* | (2006.01) | |

(52) U.S. Cl.
CPC ....... *B60L 11/1809* (2013.01); *B60L 11/1861* (2013.01)

(58) Field of Classification Search
CPC .. B60L 11/1861; G05D 1/0272; G05D 1/027; G05D 1/0278; G05D 2201/0216; G05D 1/0255
USPC ........................................................ 701/23
See application file for complete search history.

(56) References Cited

FOREIGN PATENT DOCUMENTS

| JP | 2013027065 A | * | 2/2013 |
|---|---|---|---|
| JP | 2013-066283 A | | 4/2013 |
| KR | 10-1028020 | | 4/2011 |
| KR | 10-2012-0059733 A | | 6/2012 |
| KR | 10-2012-0109883 | * | 10/2012 |
| KR | 10-2013-0082360 A | | 7/2013 |
| KR | 10-2014-0016660 A | | 2/2014 |
| KR | 10-1459489 B1 | | 11/2014 |

(Continued)

*Primary Examiner* — Maceeh Anwari
(74) *Attorney, Agent, or Firm* — Mintz Levin Cohn Ferris Glovsky and Popeo, P.C.; Peter F. Corless

(57) ABSTRACT

A charging control method and system for an electric vehicle are provided. The charging control method includes monitoring, by a controller, a state of an auxiliary battery including a state of charge (SOC), temperature, and charging current of the auxiliary battery. A charging mode of the electric vehicle is then determined based on the monitored state of the auxiliary battery. A charging voltage of the auxiliary battery is set based on the monitored SOC and temperature of the auxiliary battery and then the auxiliary battery is charged with the set charging voltage.

12 Claims, 1 Drawing Sheet

(56) References Cited

FOREIGN PATENT DOCUMENTS

KR         10-1484241 B1    1/2015
KR   10-2015-0075654 A    7/2015

* cited by examiner

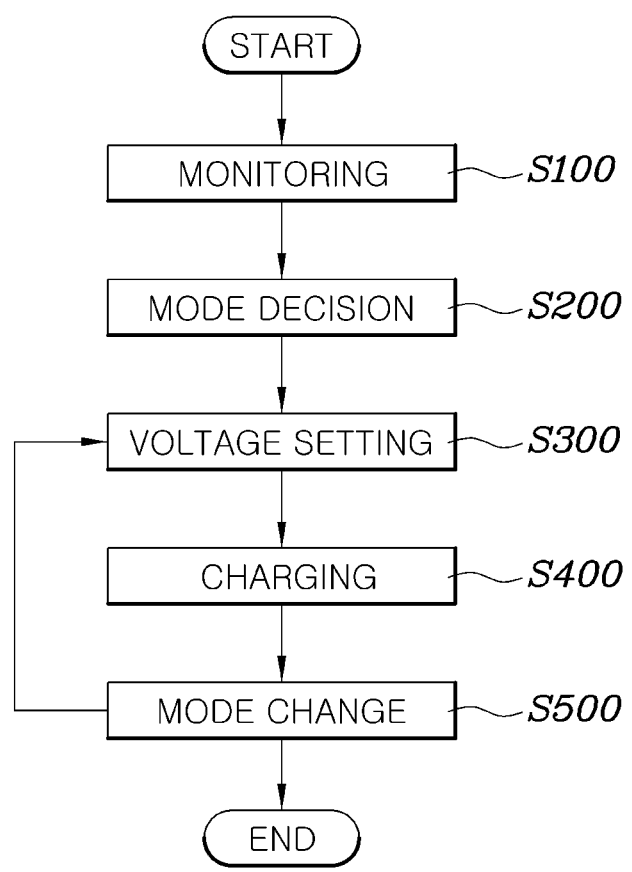

CHARGING CONTROL METHOD AND SYSTEM FOR ELECTRIC VEHICLE

CROSS REFERENCE TO RELATED APPLICATION

The present application claims priority to Korean Patent Application No. 10-2015-0131513, filed Sep. 17, 2015 the entire contents of which is incorporated herein for all purposes by this reference.

BACKGROUND

1. Field of the Invention

The present invention relates to a charging control method and system for an electric vehicle, which sets different charging control methods based on the state of charge (SOC) of the auxiliary battery of the electric vehicle, thus improving the charging efficiency of the electric vehicle.

2. Description of the Related Art

Recently, due to the insufficiency of environment-friendly products and energy attributable to environmental pollution, the conservation of energy resources has been emphasized. Accordingly, even in the automobile industry, electric vehicles, which are environment-friendly and have high energy efficiency, have been developed to improve competitiveness. Recently, owing to the improvement in the performance of batteries or the like and the reduction in the cost of batteries, the use of electric vehicles as general-purpose vehicles has been realized. Electric vehicles are characterized in that carbon dioxide is not emitted during driving and excellent environmental performance is exhibited, and in which the attraction of vehicles, such as improved acceleration responsiveness or a sensation of silent and smooth driving, has been improved.

Typically, an electric vehicle requires operating power for electronic units mounted therein and driving power for driving the motor that moves the electric vehicle. The operating power and the driving power are supplied from a battery. Generally, a main battery in which multiple battery cells are connected in series is used to provide the driving power. However, since the electronic units of an electric vehicle are operated at a voltage lower than that of the operating power and the driving power, they are configured to be driven by receiving power obtained by down-converting power supplied from the main battery, or by receiving power from an additional auxiliary battery that supplies power suitable for electronic units. Particularly, the electronic units also include an electronic unit for starting the electric vehicle.

Therefore, for electric vehicles, technology for preventing the discharge of an auxiliary battery has been continuously developed to prevent the occurrence of the situation in which starting or the use of electronic units becomes impossible. The related art teaches a control method that enables an auxiliary battery to be charged as required even when an electric vehicle is in an ignition (IG)-ON state, thus improving the reliability and marketability of electric vehicles.

However, such conventional technology merely provides a control method for charging when the voltage of an auxiliary battery is low, and does not provide a control method in relation to the charging control strategy for the auxiliary battery when the voltage of the auxiliary battery is sufficiently high or is maintained at a suitable voltage level. Accordingly, the auxiliary battery may continue to be charged even when the voltage of the auxiliary battery is sufficiently high, and thus the fuel efficiency of the electric vehicle may deteriorate.

The foregoing is intended merely to aid in the better understanding of the background of the present invention, and is not intended to mean that the present invention falls within the purview of the related art that is already known to those skilled in the art.

SUMMARY

Accordingly, the present invention provides a charging control method and system for an electric vehicle, which improves the charging efficiency of an auxiliary battery and the fuel efficiency of the electric vehicle by establishing different charging strategies for the auxiliary battery based on whether the state of charge (SOC) of the auxiliary battery is high or low.

Accordingly, the present invention provides a charging control method for an electric vehicle that may include monitoring, by a controller, a state of an auxiliary battery including a state of charge (SOC), temperature, and charging current of the auxiliary battery; determining, by the controller, a charging mode of the electric vehicle based on the monitored state of the auxiliary battery; setting, by the controller, a charging voltage of the auxiliary battery in the determination of charging mode based on the monitored SOC and temperature of the auxiliary battery; and charging, by the controller, the auxiliary battery with the set charging voltage.

The charging mode may include a charging-oriented mode for charging the auxiliary battery and a low-voltage charging mode for maintaining a voltage of the auxiliary battery. The determination of the charging mode may include, when the monitored SOC of the auxiliary battery is greater than a preset first SOC criterion for a preset first minimum holding time, determining, by the controller, the low-voltage charging mode of the vehicle as the charging mode. The first minimum holding time may be changed based on a value of the monitored SOC of the auxiliary battery. Additionally, the determination of the charging mode may include, when the monitored SOC of the auxiliary battery is less than or equal to a preset first SOC criterion, determining, by the controller, the charging-oriented mode of the electric vehicle as the charging mode.

The charging control method may further include, after charging the auxiliary battery, changing, by the controller, the charging mode of the electric vehicle based on the monitored state of the auxiliary battery. Additionally, the changing of the charging mode may include, when a holding time of the charging-oriented mode is greater than a maximum time, changing, by the controller, the charging mode of the electric vehicle to the low-voltage charging mode. The maximum time may be changed based on a value of the monitored SOC of the auxiliary battery.

Further, the changing of the charging mode may include, when the monitored SOC of the auxiliary battery is less than or equal to the first SOC criterion and is greater than a second SOC criterion, which is preset to a value less than that of the first SOC criterion, for a preset second minimum holding time, and when an average charging current of the auxiliary battery at the charging is greater than a charging current criterion, changing, by the controller, the charging mode of the electric vehicle to the low-voltage charging mode. The second minimum holding time may be changed based on the value of the monitored SOC of the auxiliary battery. The setting of the charging voltage may include setting the charging voltage using map data in which the temperature and the SOC of the auxiliary battery based on the determined charging mode are used as inputs and the charging voltage is an output.

BRIEF DESCRIPTION OF THE DRAWINGS

The above and other objects, features and advantages of the present invention will be more clearly understood from the following detailed description taken in conjunction with the accompanying drawing, in which:

FIG. 1 is a flowchart showing a charging control method for an electric vehicle according to an exemplary embodiment of the present invention.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the attached drawings.

As shown in FIG. 1, a charging control method for an electric vehicle according to the present invention may include monitoring (S100) by a controller the state of an auxiliary battery including the state of charge (SOC), the temperature, and the charging current of the auxiliary battery; determining (S200) by the controller the charging mode of the electric vehicle based on the monitored state of the auxiliary battery; setting (S300) by the controller the charging voltage of the auxiliary battery in the determined charging mode based on the SOC and the temperature of the auxiliary battery; and charging (S400) by the controller the auxiliary battery with the set charging voltage.

The monitoring may include monitoring the state of the auxiliary battery, including the SOC, temperature, and charging current of the auxiliary battery. In particular, the SOC and the charging current may be used as determination criteria for determining the charging mode of the auxiliary battery, which will be described later, and the SOC and the temperature may be used as determination criteria for setting the charging voltage. The monitored information may represent the state of the auxiliary battery, which includes the SOC, the temperature, and the charging current of the auxiliary battery. In addition, information related to the auxiliary battery, for example, the voltage and degradation of the auxiliary battery may also be included in the state of the auxiliary battery.

After monitoring the state of the auxiliary battery, the charging mode of the vehicle based on the monitored state of the auxiliary battery may be performed. The method for determining the charging mode of the vehicle may be implemented in various manners. It may be possible to monitor the state information of the auxiliary battery in real time and then determine the charging mode. Alternatively, it may also be possible to divide a time period into uniform unit time intervals and separately determine the charging mode in respective time intervals. Further, even for charging mode types, charging modes may be implemented in various forms, such as a quick charging mode or a slow charging mode. As examples of various forms, the present invention may include the configuration of dividing the charging modes of the auxiliary battery into a charging-oriented mode for charging the auxiliary battery and a low-voltage charging mode for maintaining the voltage of the auxiliary battery.

The charging-oriented mode may be referred to as a mode for charging the auxiliary battery. This mode may be the charging mode intended to be used when the auxiliary battery requires charging and the auxiliary battery is in danger of being completely discharged. Therefore, the charging voltage may be set to the highest possible voltage value within the allowable charging voltage range. Meanwhile, the low-voltage charging mode may be a mode in which the voltage of the auxiliary battery is already sufficiently high, and the charging of the auxiliary battery is not required, and thus it may be sufficient to merely maintain the charging voltage of the auxiliary battery to maintain the voltage state of the auxiliary battery. Therefore, the charging voltage may be set to a value less than the charging voltage that is set when the charging mode is the charging-oriented mode.

In particular, a point to be addressed is the concept of the charging voltage. The term "charging voltage" described in the present application refers to the charging voltage required to charge the auxiliary battery. In a typical electric vehicle, the auxiliary battery is charged with a low voltage obtained by converting a high voltage from a high-voltage battery into the low voltage via a low voltage converter, that is, a Low Direct Current (DC)/DC Converter (LDC). Therefore, the voltage of the auxiliary battery may be the same as the output voltage of the LDC. This concept is applied to the present invention in the same manner, and the charging voltage, which has been described above or will be described later, has the same meaning as the output voltage of the LDC.

As described above, under the assumption that the modes that may be determined are a charging-oriented mode and a low-voltage charging mode, the criteria for classifying the charging mode based on the monitored state of the auxiliary battery may become a problem. Therefore, in the present invention, criteria for classifying charging modes based on the state of the auxiliary battery are presented. In particular, classification methods using the SOC and the average charging current of the auxiliary battery are described separately.

As a first classification criterion, the method presented in the present invention is configured such that, when the monitored SOC of the auxiliary battery exceeds a first SOC criterion for a preset first minimum holding time, the controller may be configured to determine a low-voltage charging mode as the charging mode of the vehicle. As the SOC increases, the battery becomes closer to a fully charged state. Therefore, the first SOC criterion must have a sufficiently high SOC value that the above-described low-voltage charging mode may be determined as the charging mode. The first SOC criterion may have various values based on the selection of a designer. However, when the first SOC criterion is set to an excessively low value, the auxiliary battery may be in a danger of being discharged, and thus the first SOC criterion may preferably be set to about 90%.

However, even when the monitored SOC of the auxiliary battery is greater than the first SOC criterion, the low-voltage charging mode may not be determined as the charging mode. In the present invention, the criterion for determining the low-voltage charging mode as the charging mode prescribes that the SOC must exceed the first SOC criterion for the first minimum holding time. Accordingly, error that may occur due to noise during the monitoring process or voltage peaks in the auxiliary battery may be prevented and the phenomenon in which the SOC is reduced with the lapse of time may be compensated for. In other words, the first minimum holding time may be freely set based on the designer's selection. However, to minimize error caused by noise or voltage peaks, the first minimum holding time may be set to a large value, as an example, about 3600 sec. However, when the first minimum holding time is set to an excessively large value, the time required to determine the charging mode increases, and thus, the efficiency of vehicle charging may deteriorate, thus influencing the fuel efficiency of the vehicle. As a result, the first minimum holding time may be set to a suitable value in consideration of both the advantages and disadvantages thereof.

Further, although the first minimum holding time may be freely set, the set value may be changed based on the monitored SOC of the auxiliary battery since when the first SOC criterion is assumed to be, for example, about 90%, the efficiency of the system may deteriorate when the SOC of the auxiliary battery is 91% and 99% and are controlled in the same way. Since the case when the SOC is 99% is more different from the first SOC criterion than the case where the SOC is 91%, there is no need to set the first minimum holding time to a substantial period of time. Therefore, the first minimum holding time may be changed based on the value of the monitored SOC of the auxiliary battery, wherein the first minimum holding time may be set to a shorter time as the difference from the first SOC criterion increases.

In contrast, when the monitored SOC of the auxiliary battery is less than or equal to the preset first SOC criterion, the controller may be configured to determine the charging-oriented mode as the charging mode of the vehicle. When the monitored SOC is less than or equal to the first SOC criterion, indicates the state of the battery in which the auxiliary battery needs to be charged to some degree, as described above. Therefore, in this case, the low-voltage charging mode may be determined, rather than the charging-oriented mode, as the charging mode.

Regardless of whether the charging-oriented mode or the low-voltage charging mode is determined as the charging mode, the controller may be configured to set the charging voltage of the auxiliary battery based on the monitored SOC and temperature of the auxiliary battery after determining the charging mode. Therefore, the present invention may secondarily improve charging efficiency by setting the charging voltage differently in consideration both of the SOC and of the temperature of the auxiliary battery even in the corresponding charging mode, while primarily improving the charging efficiency using the step of classifying the auxiliary battery charging mode in consideration of the SOC of the auxiliary battery.

In particular, the SOC and the temperature may be considered as variables required to set the charging voltage since the SOC and the temperature of the auxiliary battery correspond to indicators that enable the state of charge of the auxiliary battery to be detected more easily. The SOC of the auxiliary battery indicates the state of charge, which may be regarded as the most direct factor in setting the charging voltage. Therefore, the lower the SOC of the auxiliary battery, the higher the probability of the battery being discharged, and thus the charging voltage may be to a higher value.

However, the temperature of the auxiliary battery has a characteristic slightly different from that of the SOC. Generally, the temperature of an electric device may be determined based on the amount of current flowing through the device. Further, each electric device has its own specific load resistance. The temperature may increase in proportion to a value, obtained by multiplying the square of current flowing through a load resistor by the load resistance. In particular, since the load resistance is a unique value defined for each electric device, it may be considered that, as a result, the temperature is in proportion to the square of the current. "Current", in the literal meaning of the word, means the flow of electrons. Accordingly, it may be deduced that, when the flow of electrons is substantial, that is, when the charging of the auxiliary battery is performed rapidly, the temperature may increase significantly.

Therefore, considering such temperature characteristics, the case when the temperature of the auxiliary battery is high may indicate that the auxiliary battery is already being charged at high speed. Accordingly, continuing to charge the auxiliary battery in this case may accelerate the degradation of the battery, thus negatively influencing the durability of the battery. In contrast, in the case when the temperature of the auxiliary battery is low, there is a low probability of the battery being degraded. Accordingly, in this case, the charging voltage may be set to a high value, thus minimizing the likelihood that the auxiliary battery will be discharged.

In other words, in the voltage setting process (S300), the charging voltage may be set in consideration of the SOC and the temperature of the auxiliary battery, but may be set the charging voltage to a greater value as the SOC of the auxiliary battery is decreases or as the temperature of the auxiliary battery is decreases. Such a charging voltage may be set to various values based on the type and state of the vehicle. As an example thereof, the present invention presents a method for setting the charging voltage by utilizing map data in which the temperature and SOC of the auxiliary battery based on the charging mode are used as inputs and the charging voltage is an output.

After the voltage has been set, the controller may be configured to charge the auxiliary battery with the set charging voltage is performed, as shown in FIG. 1. As described above, as the method for charging the auxiliary battery, the method for converting a high voltage from a high-voltage battery into a low voltage using the LDC and charging the auxiliary battery with the low voltage may be the most commonly used method.

After the charging process (S400), when the auxiliary battery is charged in the low-voltage charging mode, the low-voltage charging mode may be continuously maintained until the SOC of the auxiliary battery decreases to be less than or equal to the first SOC criterion. However, when the charging mode of the auxiliary battery is the charging-oriented mode, the situation may slightly differ from the above case. Since the charging-oriented mode is a mode in which the auxiliary battery is continuously charged, the SOC of the auxiliary battery may increase with the lapse of time. Therefore, the auxiliary battery may not require further charging after the lapse of time. Therefore, to respond to this situation, the present invention performs the mode change process (S500) by the controller which may be configured to change the charging mode of the vehicle based on the monitored state of the auxiliary battery, after the charging process has been performed, as shown in FIG. 1.

The monitoring process (S100) may be the first step of the present invention. Even when the mode determination (S200), the voltage setting (S300), and the charging (S400) have been performed, the controller may be configured to continuously monitor the state of the auxiliary battery. Therefore, at the mode determination (S200), even when the charging-oriented mode was determined as the charging mode and charging of the auxiliary battery is required, it may be possible to change the charging mode when, as a result of continuously monitoring of the state of the auxiliary battery, the state of the auxiliary battery corresponds to the state in which charging is not required any longer.

The state of the auxiliary battery that becomes the criterion for changing the charging mode may be determined using various variables, such as the current and temperature of the auxiliary battery. Therefore, several methods based on variables determined to be most reasonable among various variables that may be considered in the present invention are presented. The first method is configured such that, when the holding time of the charging-oriented mode exceeds the maximum time, the controller may be configured to change the charging mode of the vehicle to a low-voltage charging mode.

The changing of the charging mode based on the holding time of the charging-oriented mode enables the state of charging to be more easily determined while securing the accuracy of determination. As described above, in the charging-oriented mode, charging may be continuously performed, and thus the SOC of the auxiliary battery may gradually increase with the lapse of time. Accordingly, after an amount of time sufficient to exceed a predetermined SOC, that is, the first SOC criterion, has elapsed, charging efficiency may be improved by changing the charging mode to the low-voltage charging mode, thus resulting in improved vehicle fuel efficiency. Even the maximum time in this case may be changed based on the value of the monitored SOC of the auxiliary battery in the same way as the above-described first minimum holding time, and the maximum time may decrease as the SOC of the auxiliary battery increases.

The second method is configured such that, when the monitored SOC of the auxiliary battery is less than or equal to the first SOC criterion and is greater than a second SOC criterion, which is preset to a value less than the first SOC criterion, for a preset second minimum holding time, and when the average charging current of the auxiliary battery during the charging is greater than a charging current criterion, the controller may be configured to change the charging mode of the vehicle to the low-voltage charging mode.

The second method as described above, which is a more specific method than the above-described first method, requires more information to change the mode, but may secure higher reliability from the standpoint of accuracy. This method considers all of the SOC, the holding time, and the average charging current of the auxiliary battery. Since the average charging current is closely related to temperature, similar to the voltage setting (S300), the present method may also use the SOC and temperature as determination criteria.

In this method, the value of the second SOC criterion is less than that of the first SOC criterion. Accordingly, when the first SOC criterion is about 90%, as described above in the above exemplary embodiment, the second SOC criterion may be set to be about 85%. However, this value may be freely changed as deemed necessary by the designer. The criterion for the charging current may also have various values as deemed necessary by the designer or according to the type of vehicle. However, assuming a typical battery voltage, the charging current criterion may preferably be set to about 20A. In addition, the average charging current of the auxiliary battery may mean the average current used to charge the auxiliary battery during a second minimum holding time.

The second minimum holding time may be freely set based on the designer's selection, similar to the first minimum holding time, and may be changed based on the value of the monitored SOC of the auxiliary battery. However, the second minimum holding time may be set such that as the SOC of the auxiliary battery increases, the second minimum holding time may decrease, similar to the maximum time.

As described above, when the present invention is used, the following advantages may be obtained.

First, when the SOC of an auxiliary battery is substantially high, charging control is not performed for a long period of time, thus increasing the charging efficiency of the auxiliary battery and improving the fuel efficiency of the electric vehicle.

Second, the charging efficiency may be improved by setting the charging voltage differently based on the SOC and the temperature of the auxiliary battery.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A charging control method for an electric vehicle, comprising:
   monitoring, by a controller, a state of an auxiliary battery including a state of charge (SOC) and temperature of the auxiliary battery;
   determining, by the controller, a charging mode of the electric vehicle based on the monitored state of the auxiliary battery;
   setting, by the controller, a charging voltage of the auxiliary battery based on the monitored SOC and temperature of the auxiliary battery; and
   charging, by the controller, the auxiliary battery with the set charging voltage,
   wherein the charging mode includes a charging-oriented mode for charging the auxiliary battery and a low-voltage charging mode for maintaining a voltage of the auxiliary battery, and
   wherein the determination of the charging mode includes:
      when the monitored SOC of the auxiliary battery is greater than a preset first SOC criterion for a preset first minimum holding time, determining, by the controller, the low-voltage charging mode of the vehicle as the charging mode; and
      when the monitored SOC of the auxiliary battery is less than or equal to the preset first SOC criterion, determining, by the controller, the charging-oriented mode of the electric vehicle as the charging mode wherein the first minimum holding time is changed based on a value of the monitored SOC of the auxiliary battery.

2. The charging control method of claim 1, further comprising:
   after charging the auxiliary battery, changing, by the controller, the charging mode of the electric vehicle based on the monitored state of the auxiliary battery.

3. The charging control method of claim 2, wherein the changing of the charging mode includes:
   when a holding time of the charging-oriented mode is greater than a maximum time, changing, by the controller, the charging mode of the electric vehicle to the low-voltage charging mode.

4. The charging control method of claim 3, wherein the maximum time is changed based on a value of the monitored SOC of the auxiliary battery.

5. The charging control method of claim 2, further comprising:
   monitoring, by the controller, the state of the auxiliary battery including the state of charge (SOC), the temperature, and charging current of the auxiliary battery,
   wherein the changing of the charging mode comprises:
   when the monitored SOC of the auxiliary battery is less than or equal to the first SOC criterion and is greater than a second SOC criterion, which is preset to a value less than that of the first SOC criterion, for a preset second minimum holding time, and when an average charging current of the auxiliary battery at the charging is greater than a charging current criterion, changing, by the controller, the charging mode of the electric vehicle to the low-voltage charging mode.

6. The charging control method of claim 5, wherein the second minimum holding time is changed based on the value of the monitored SOC of the auxiliary battery.

7. The charging control method of claim 1, wherein the setting of the charging voltage includes setting, by the controller, the charging voltage using map data in which the temperature and the SOC of the auxiliary battery based on the determined charging mode are used as inputs and the charging voltage is an output.

8. A charging control system for an electric vehicle, comprising:
   a memory configured to store program instructions; and
   a processor configured to execute the program instructions, the program instructions when executed configured to:
      monitor a state of an auxiliary battery including a state of charge (SOC) and temperature of the auxiliary battery;
      determine a charging mode of the electric vehicle based on the monitored state of the auxiliary battery;
      set a charging voltage of the auxiliary battery based on the monitored SOC and temperature of the auxiliary battery; and
      charge the auxiliary battery with the set charging voltage,
   wherein the charging mode includes a charging-oriented mode for charging the auxiliary battery and a low-voltage charging mode for maintaining a voltage of the auxiliary battery, and
   wherein the program instructions when executed are further configured to:
      determine the low-voltage charging mode of the vehicle as the charging mode when the monitored SOC of the auxiliary battery is greater than a preset first SOC criterion for a preset first minimum holding time; and
      determine the charging-oriented mode of the electric vehicle as the charging mode when the monitored SOC of the auxiliary battery is less than or equal to the preset first SOC criterion wherein the first minimum holding time is changed based on a value of the monitored SOC of the auxiliary battery.

9. The charging control system of claim 8, wherein the program instructions when executed are further configured to:
   change the charging mode of the electric vehicle based on the monitored state of the auxiliary battery after charging the auxiliary battery.

10. The charging control system of claim 9, wherein the program instructions when executed are further configured to:
    change the charging mode of the electric vehicle to the low-voltage charging mode when a holding time of the charging-oriented mode is greater than a maximum time.

11. The charging control system of claim 10, wherein the maximum time is changed based on a value of the monitored SOC of the auxiliary battery.

12. The charging control system of claim 9, wherein the program instructions when executed are further configured to:
    change the charging mode of the electric vehicle to the low-voltage charging mode when the monitored SOC of the auxiliary battery is less than or equal to the first SOC criterion and is greater than a second SOC criterion, which is preset to a value less than that of the first SOC criterion, for a preset second minimum holding time, and when an average charging current of the auxiliary battery at the charging is greater than a charging current criterion.

\* \* \* \* \*